July 28, 1936.  A. O. SCHAEFER  2,049,083
KNIVES FOR MEAT CHOPPERS
Filed Nov. 2, 1934
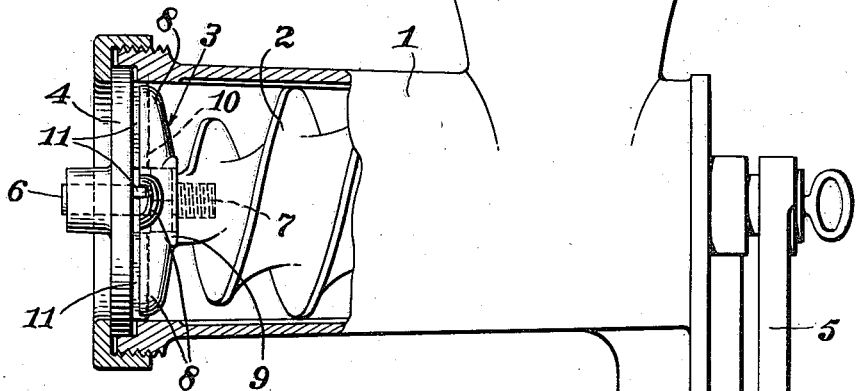
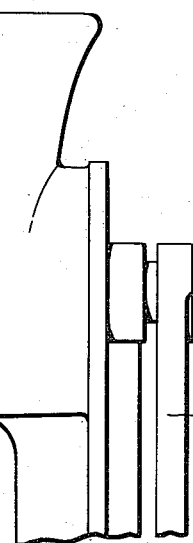
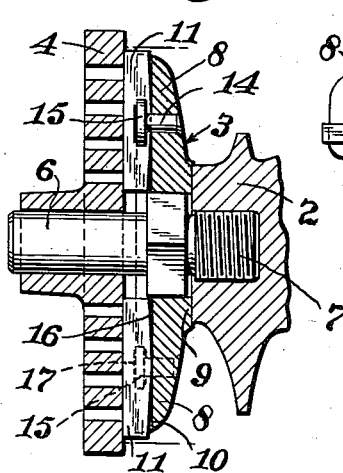
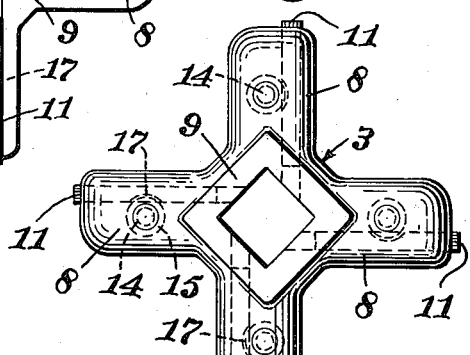
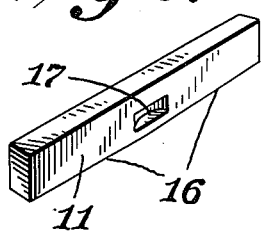
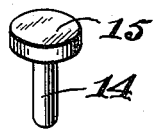
Inventor:
Adolph O. Schaefer,
By Parker Cook,
Attorney.

Patented July 28, 1936

2,049,083

UNITED STATES PATENT OFFICE 2,049,083

KNIVES FOR MEAT CHOPPERS

Adolph O. Schaefer, Brooklyn, N. Y., assignor to Atlantic Service Company, Inc., Brooklyn, N. Y., a corporation of New York Application November 2, 1934, Serial No. 751,211

1 Claim. (Cl. 146—189)

My invention relates to new and useful improvements in knives for meat choppers, and more particularly to a knife comprising a carrier or frame having blades which may be replaced within the carrier when necessary by proper factory representatives.

The present invention in its broadest aspect is somewhat similar to the knife shown in the application of Charles A. Laemmel on Knives for food choppers, Filed September 3, 1932, Serial No. 631,721, which became Patent No. 1,986,933 on January 8, 1935, and a further application for Food choppers, filed by Charles A. Laemmel on February 3, 1933, Serial No. 655,093 which became Patent No. 1,986,934 on January 8, 1935.

In the two applications above-mentioned, as well as in the present application, the blades are capable of self-alignment, that is, the blades or knives are convex on their under surfaces, which permits a slight rocking of the blades, so that the cutting edges will always lie flat against the plate and thus cause the meat to be sharply cut rather than torn or ground. In the two former applications, however, the blades were held in a quickly removable position by either being sprung into a tortuous slot or were provided with studs at their one end or provided with a curved end, thus permitting the blades to properly align themselves but also be capable of quick removal. I have found, however, in some instances that it may be desirable to construct the carrier having the rockable and self-aligning feature of the blades and, at the same time, provide a holding means that will not only allow these blades to rock or adjust themselves but will so hold the blades that it will be a factory operation or, in other words, difficult for the user to remove and replace them.

Still another object of the invention, therefore, is to provide a carrier having kerfs or slots within which rockable blades are positioned together with means provided for holding the blades permanently within the slots but, at the same time, allow the blades to rock to thus properly position themselves.

Still another object of the invention is to provide a carrier with rockable blades in slots wherein studs or rivets are so positioned in the carrier that they will overhang a portion of the slot and loosely fit within an aperture formed within the blade, so that after the blades are once positioned the studs or rivets may be peened or hammered down at their far end to thus, in reality, rivet the blades in place. It is, however, possible at the factory especially, to drive out these rivets and replace knives, if it is found more economical than providing a new carrier with new blades.

With these and numerous other objects in view, which will appear as the specification proceeds, the invention consists in certain new and novel features and combination of parts, as will be hereinafter more fully explained and pointed out in the claims.

Referring now to the drawing showing a preferred embodiment,

Fig. 1 is a side elevation, partly broken away, of a meat chopper having the present invention embodied therein;

Fig. 2 is an enlarged sectional fragmentary view showing the knife in position against the perforated plate;

Fig. 3 is a slightly enlarged face view of the carrier or frame with three of the blades fitted in position within their respective grooves, one of the grooves being left vacant for clearness of illustration;

Fig. 4 is a back view of the carrier frame;

Fig. 5 is an enlarged perspective of one of the knife blades;

Fig. 6 is an enlarged perspective of what I term the retaining lug or rivet.

Referring now more particularly to the several views, there is shown a conventional type of meat chopping machine 1 with the screw or helix 2 therein which, at its outer end, bears against the rear of the knife carrier 3, the blades of which, to be shortly mentioned, in turn, bear against the inner surface of the usual perforated plate 4. The helix and knife are revolved through the medium of a handle 5, while the opposite end of the helix is supported by the stud 6 which passes through the carrier 3 and extends, as at 7, into the end of the said worm or helix 2.

With the exception of the knife carrier and its blades, the above-mentioned parts are conventional.

Referring now for the moment to Figs. 2, 3 and 4, it will be seen that the knife carrier comprises a frame having the radially extending arms 8, there being a rectangular hub 9 centrally of the frame in which a portion of the stud 6 is fixed, so that, of course, the carrier will revolve with the helix.

Now as may be clearly seen in Fig. 3, each of the arms 8 is provided with a slot 10 which extends from the outer extremity of the arm to the hub opening and in which is to be fitted its blade 11, as will shortly be described. It will be understood that a description and reference to one arm and its blade are a description of all the arms.

Spaced a slight distance from the slot 10, there is drilled transversely through the arm a hole 12, which hole is slightly counterbored, as at 13, and as will be noticed the distance of the hole 12 from the slot 10 is such that a portion of the vertical wall of the counterbore is flattened, so that when the rivet or retaining means 14 is placed within the hole 12, one edge of its head 15 will extend beyond the adjacent side wall of the slot 10, the purpose being to retain the blade 11 in position within its slot.

Referring for the moment to Figs. 2 and 5, there will be seen the blade 11 which is preferably rectangular in shape and has the slightly convex bottom wall 16, so that the blade when placed within its slot is capable of a slight rocking movement from end to end.

As will also be noticed in Fig. 5, in one of the side walls of the blade 11, there is a small milled recess 17 which is so spaced that when the rivet 14 is in position, the head 15 of the rivet will fit within this milled recess 17, and after the rivet is peened or flattened out on its rear end, the blade 11 will be rockably retained within its slot 10. It will be understood that the width of the cut-out portion 17 is slightly greater than the vertical dimension of the head 15 of the pin, so that there will be a slight clearance between the upper and lower walls of the head 15 of the rivet and the upper and lower walls of the cut-out portion 17. In other words, the blade is so held by the rivet or retaining means 14 that the blade may rock perceptibly throughout its length on its convex under surface but cannot move but slightly in a radial position nor can it be removed from the carrier frame unless the peened head of the rivet be filed and driven bodily through the carrier frame.

If it is found desirable to install new knife blades, as heretofore mentioned the rear ends of the rivets may be filed off and the rivets removed from the carrier and new knives inserted. Afterwards, the heads 15 of the rivets are placed within the cut-out portions of the respective knives and the rivets again peened on their rear enrs to thus rockably hold the blades in position.

It might be mentioned that the carrier frame as shown in the drawing would illustrate an ordinary carrier but the knife and rivet as shown in Figs. 5 and 6 are on an enlarged scale.

From the foregoing, it will be seen that I have provided a carrier frame wherein knives are rockably supported within the carrier frame but, at the same time, are so held as to prevent loss or ordinary removal. In this manner, the knives can wear evenly down against the plate but should they become chipped or badly nicked, the carrier can be returned to the factory and after a slight operation new blades can be inserted.

I am aware that it is old to permanently lock blades within a carrier frame and even temporarily hold blades within a carrier frame, but I am not aware of a carrier provided with knives that are self-aligning, that is, rockable from end to end, so that the cutting edges may at all times present a flat surface to the perforated plate and wherein holding means are provided to retain the knives but permit of the insertion of new blades if the rivets are first filed and then driven bodily from the carrier frame.

Having thus described my invention, what I claim as new and desire to secure by Letters Patent is:

A knife for meat choppers including a carrier frame having a central hub, radially extending arms and each of said arms provided with a slot having a straight flat bottom and an opening extending transversely of the arm, the opening being counterbored, rectangularly-shaped knives fitted within said slots and said rectangularly-shaped knives being tapered on their under surface toward the center, the side walls of the respective knives being slotted, studs within said openings the heads of which are of less thickness than the width of the slots and extend respectively into the slots of the knives to prevent radial movement of the knives and also prevent their removal but allowing the said knives to respectively rock throughout their length.

ADOLPH O. SCHAEFER.